(12) United States Patent
Legh-Smith et al.

(10) Patent No.: US 6,178,419 B1
(45) Date of Patent: Jan. 23, 2001

(54) DATA ACCESS SYSTEM

(75) Inventors: Jon Legh-Smith, Ipswich; Steve Appleby, Cochester; Ian Fairman; Sarah Eyles, both of Ipswich, all of (GB)

(73) Assignee: British Telecommunications plc, London (GB)

(*) Notice: Under 35 U.S.C. 154(b), the term of this patent shall be extended for 0 days.

(21) Appl. No.: 09/068,462

(22) PCT Filed: Jul. 18, 1997

(86) PCT No.: PCT/GB97/01949

§ 371 Date: May 6, 1998

§ 102(e) Date: May 6, 1998

(87) PCT Pub. No.: WO98/04979

PCT Pub. Date: Feb. 5, 1998

(30) Foreign Application Priority Data

Jul. 31, 1996 (EP) .................................................. 96305879

(51) Int. Cl.[7] .................................................... G06F 17/30
(52) U.S. Cl. ......................... 707/6; 707/1; 707/2; 707/3; 707/5; 707/10; 707/100; 707/104; 707/200; 707/201
(58) Field of Search .................................. 707/1, 2, 3, 5, 707/6, 10, 201, 100, 104, 202; 711/202; 395/400, 425, 601, 602, 612; 345/327; 348/13; 455/4.2; 702/186; 704/251, 270, 275; 714/20, 26, 712; 379/10, 14, 15, 26, 29, 34; 709/218; 706/45

(56) References Cited

U.S. PATENT DOCUMENTS

| | | | |
|---|---|---|---|
| 5,404,514 | * | 4/1995 | Kageneck et al. ........................ 707/5 |
| 5,870,740 | * | 1/1999 | Rose et al. ................................ 707/5 |
| 5,901,287 | * | 5/1999 | Bull et al. .............................. 707/210 |
| 5,920,854 | * | 7/1999 | Kirsch et al. ............................. 707/3 |
| 5,943,663 | * | 8/1999 | Mouradian .............................. 706/45 |
| 5,970,502 | * | 10/1999 | Salkewicz et al. .................. 707/201 |
| 5,974,412 | * | 10/1999 | Hazlehurst et al. ..................... 707/3 |

OTHER PUBLICATIONS

IEEE publication, "A lexicon driven approach for off–line recognition of unconstrained handwritten Korean words" by Soon H. Kim et al, Department of Computer Science, Korea, pp. 507–510, Jan. 1999.*

(List continued on next page.)

*Primary Examiner*—Thomas G. Black
*Assistant Examiner*—Diane Mizrahi
(74) *Attorney, Agent, or Firm*—Nixon & Vanderhye P.C.

(57) ABSTRACT

A method of automatically creating a database on the basis of a set of category headings uses a set of keywords provided for each category heading. The keywords are used by a processing platform to define searches to be carried out on a plurality of search engines connected to the processing platform via the Internet. The search results are processed by the processing platform to identify the URLs embedded in the search results. The URLs are then used to retrieve the pages to which they refer from remote data sources in the Internet. The processing platform then filters and scores the pages to determine which pages are the most relevant to the original categories. Internet location information for the most relevant pages is stored in the database.

6 Claims, 7 Drawing Sheets

OTHER PUBLICATIONS

Baldazo R: "Navigating with a Web compass" BYTE, Mar. 1996, McGraw–Hill, USA, vol. 21, No. 3, pp. 97–98.

McKim J: "A distributed index for the Web" Proceedings of the IASTED/ISMM International Conference. Distributed Multimedia Systems and Applications, Proceedings IASTED/ISSM Symposium. Distributed Multimedia Systems and Applications, Honolulu, HI, USA, Aug. 1994, 1994, Anaheim, CA, USA, IASTED/ISMM–ACTA Press, USA, pp. 204–208.

Hiraiwa S et al: "Info–Plaza: A social information filtering system for the World–Wide Web" Proceedings. 1996 International Conference on Paraleel and Distributed Systems (Cat. No. 96TB100045), Proceedings of 1996 International Conferenceon Parallel and Distributed Systems, Tokyo, Japan, Jun. 1996, 1996, Los Alamitos, CA, USA, IEEE Comput. Soc. Press, USA, pp. 10–15.

Beerud Sheth et al: "Evolving Agents for Personalized Information Filtering" Proceedings of the Conference on Artificial Intelligence for Applications, Orlando, Mar. 1993, No. Conf. 9, Mar. 1993, Institute of Electrical and Electronics Engineers, pp. 345–352.

* cited by examiner

DATA ACCESS SYSTEM

BACKGROUND OF THE INVENTION

1. Field of the Invention

The present invention relates to improved data access efficiency. In particular, the invention finds application in the area of tailored database creation.

2. Related Art

An example of an environment in which data is stored in a highly distributed fashion is the World Wide Web (WWW). The WWW is a vast, unstructured collection of information stored on many different servers around the Internet. Latest estimates put the number of individual pages of information at over 30 million and the number of servers at over 2,250,000.

Navigating around this quantity of data is particularly difficult without some assistance. Aids for navigation such as Indexes and Directories have been created for the WWW and represent the two main navigation approaches for the WWW.

In the case of Indexes, so-called search engines, for example AltaVista (http://altavista.digital.com), retrieve as many WWW pages as possible and index the words in each page. Typically, a search engine runs processes, known as robots or spiders, which exhaustively follow all hyper-links, embedded in retrieved pages, in selected areas of the WWW. A large Internet search engine may have a stored index of many millions of pages. Users are then able to enter a keyword, which is compared to the index entries, and receive a list of pages that contain that required keyword. This is a simple method of finding information which is, however, limited in effectiveness by how comprehensive and accurate the keyword indexes are.

A Directory, for example Yahoo, comprises a hierarchy of categories related to a particular topic. The hierarchy is defined by the creator of the Directory and has entries, under the lowest level categories, typically added by the Directory supervisor(s) or sometimes by users. It is easier to find information in a Directory than by using a search engine, as in a Directory the choices are constrained by the known topic area categories. However, the effectiveness of Directory-type WWW navigation is limited by the rigid categorisation scheme. This leads to two disadvantages: firstly, the categorisation of a particular heading may need to change leading to extensive manual re-working of the directory, and secondly, the scheme may not be suitable or intuitive for some users.

SUMMARY OF THE INVENTION

In an article entitled "Navigating with a Web Compass", R. Baldazo, Byte, March 1996, McGraw-Hill, USA, volume 21, number 3, pages 97–98, there is described a search tool which can cause search engines to perform a search on the basis of specific search terms.

According to one aspect of the present invention, there is provided an apparatus for populating a destination database, said apparatus comprising:

a destination database;

means for connecting the apparatus to a distributed source database;

a memory area for containing a group of keywords related to a predetermined subject category;

means for controlling at least one search engine associated with said distributed source database, on the basis of a group of keywords contained in said memory area, to provide search results including information relating to the location of documents containing said keywords, said documents being stored in said distributed source database;

means for scoring each of the documents identified in search results provided by said at least one search engine on the basis of the respective contents thereof in accordance with predetermined criteria;

means for selecting at least some of the documents scored by said scoring means, on the basis of their respective scores; and means for storing, for each document selected by said selecting means, in said destination database information relating to the location of the document in said distributed source database.

The invention overcomes problems associated with the known search methods by providing a practical way of populating a destination database from a much larger distributed database.

For the present purposes, and unless otherwise stated, the terms "pages" and "documents" both refer to a compilation of data stored at a single location, for example, in the WWW and are therefore interchangeable.

One example where embodiments of the invention might be useful is in a school environment in which a teacher wishes to limit the amount and type of information available to students. Once defined, the data in the database can be freely "browsed" by the students without the fear of finding inappropriate or irrelevant information. Another example is a company-wide environment where only commercial information on certain subjects, and not academic information, is required.

The memory area may be arranged to contain a set of groups of keywords, each group of keywords being related to a respective predetermined subject category. The categories may be arranged hierarchically with the most generic category at the highest level of a directory, and with increasingly more specific categories branching out at lower levels, similar, for example, to the Directories described above.

In preferred embodiments, a further step of reducing the number of retrieved document file references is included before the data is finally stored in the destination database. This allows removal of references to inappropriate or irrelevant documents. For example, if the required database has a category of "furniture" and a keyword of "tables", it would be sensible and desirable to remove references to documents relating to mathematical "tables".

According to a second aspect of this invention, there is provided an apparatus for populating a destination database, said apparatus comprising:

a destination database;

a memory area for containing a group of keywords related to a predetermined subject category; and a processing platform which can access said destination database and said memory area, which is connectable to a distributed source database, and which is arranged to:

control at least one search engine associated with said distributed database, on the basis of a group of keywords contained in said memory area, to provide search results including information relating to the location of documents containing said keywords, said document being stored in said distributed source database;

score each of the documents identified in said search results on the basis of the respective contents thereof in accordance with predetermined criteria;

select at least some of the documents on the basis of their respective scores; and store, for each selected document, in said destination database information relating to the location of the document in said distributed source database.

According to a third aspect of this invention, there is provided an apparatus for populating a destination database, said apparatus comprising:

a) means for connecting the apparatus to a distributed source database;

b) a first memory area for storing a group of keywords associated with a pre-determined subject category;

c) means for reading a keyword from the first memory area and transmitting said keyword to search means, said search means having access to the distributed source database;

d) means for receiving search results from said search means and storing said results in a second memory area, said results including information relating to the location of documents stored in said source database containing said keyword;

e) means for identifying and storing said location information in a third memory area;

f) means for reading location information from the third memory area and transmitting a request to the source database to return a copy of a document associated with selected location information to the apparatus;

g) means for receiving and storing said copy of said document in a fourth memory area;

h) means for accessing and scoring each of the documents stored in the fourth memory area on the basis of the respective contents thereof in accordance with pre-determined criteria; and i) means for selecting at least some of said documents on the basis of the respective scores and, for each selected document, storing in a database information relating to the location of the document in the source database.

According to a fourth aspect of this invention, there is provided a method A method of populating a destination database, said method comprising the steps of:

controlling at least one search engine associated with a distributed source database, on the basis of a group of keywords related to a predetermined subject category, to provide search results including information relating to the location of documents containing said keywords, said documents being stored in said distributed source database;

scoring each of the documents identified in said search results on the basis of the respective contents thereof in accordance with predetermined criteria;

selecting at least some of the documents on the basis of their respective scores; and storing, for each selected document, in said destination database information relating to the location of the document in said distributed source database.

BRIEF DESCRIPTION OF THE DRAWINGS

An embodiment of the present invention will now be described, by way of example only, with reference to the accompanying drawings, in which.

DETAILED DESCRIPTION OF EXEMPLARY EMBODIMENTS

Figure 1:
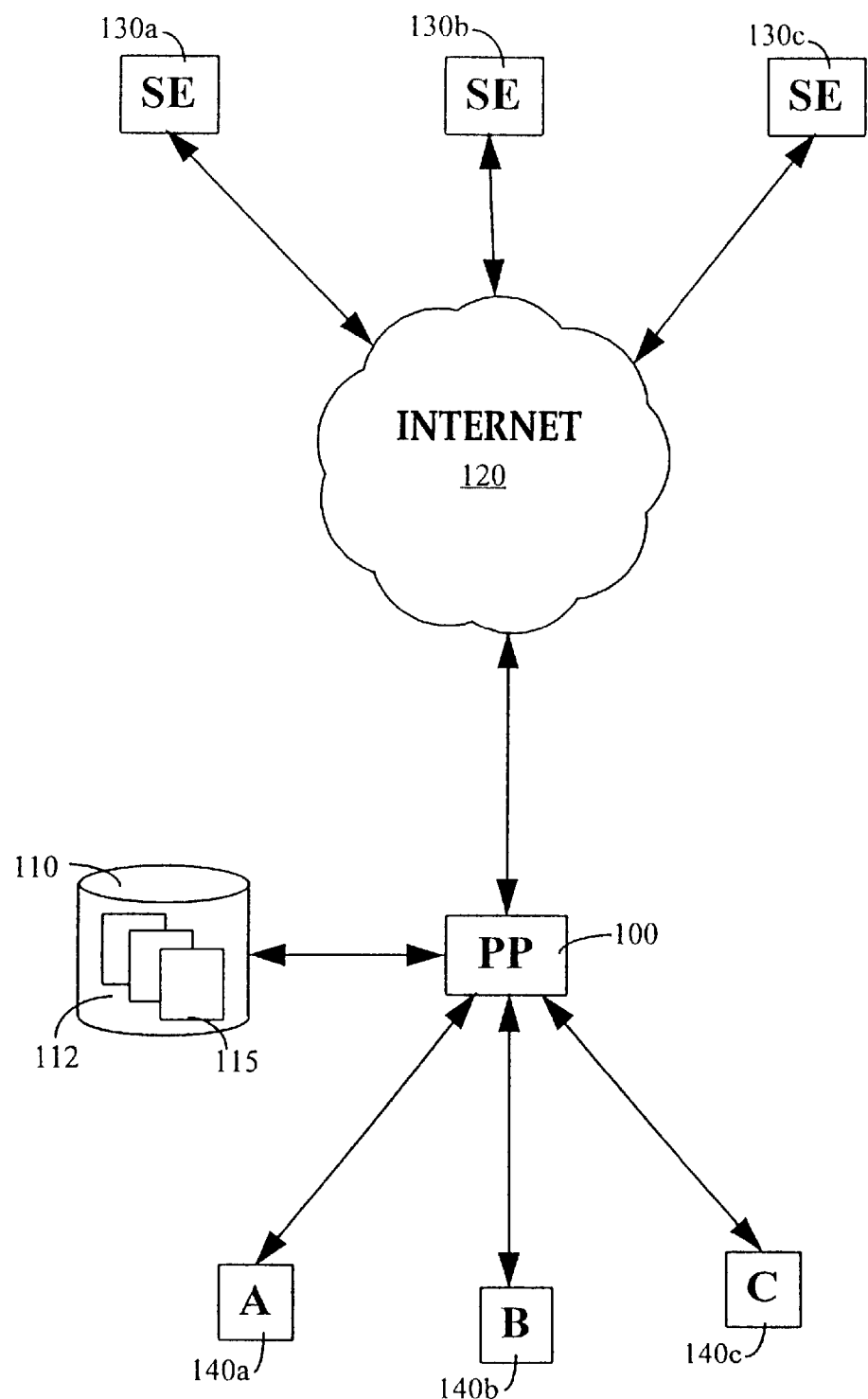
FIG. 1 is a diagram showing a system for creating a database and which embodies the present invention.

In FIG. 1, there is shown a system suitable for building and populating a destination database in accordance with an embodiment of the present invention.

In this system, a processing platform (PP) 100 controls access to a destination database 112, held in a secondary storage device 110 (for example a hard disk drive) connected to the PP 100. The destination database 112 can be located separately and remotely from PP 100. When populated, the database 112 comprises compiled data stored in data tables 115. The PP 100 is also connected, via the Internet 120, to a plurality of search engines 130a, 130b and 130c (only three of which are illustrated for clarity). The search engines 130a, 130b and 130c are arranged to search information servers connected to the Internet. These information servers form a distributed source database.

The PP 100 in this embodiment is a UNIX (TM) based computing platform running appropriate software. The PP 100 can be a server in a client/server environment. For example, it might be accessible to users across a local area network in an office or school via personal computers (PCs) 140a, 140b and 140c. Each PC 140a, 140b and 140c is able to access the required data in the database 112 under the control of appropriate controlling software running on the PC and communicating with the PP 100. The software on the PCs can be permanently stored in local memory (not shown) or can be retrieved from the PP 100 when required and executed. The software, when executed, presents a graphical user interface (GUI) to the user of the type commonly associated with known Directory search software such as Yahoo. The details of the access software need, thus, not be discussed in any further detail.

Figure 2:
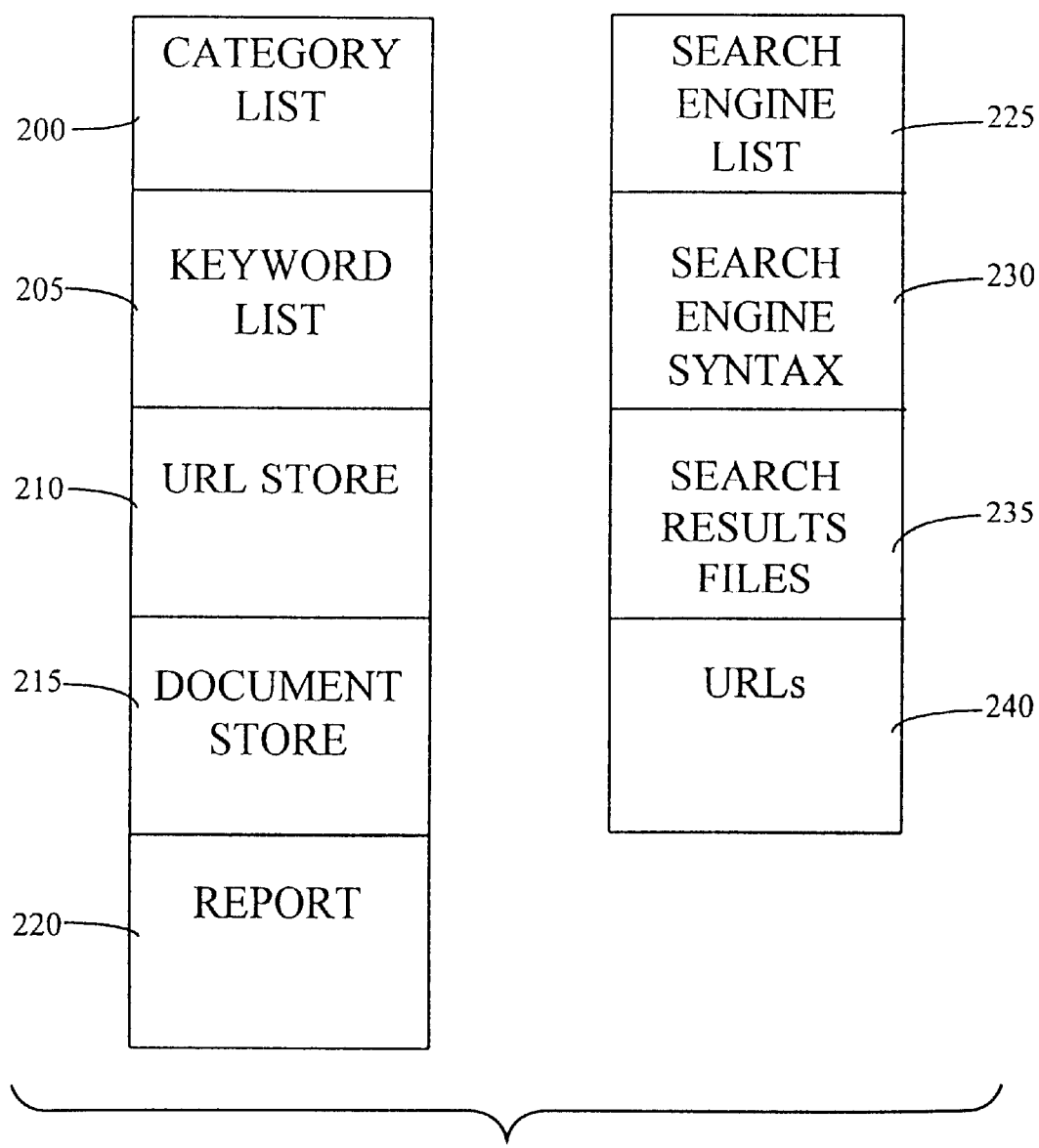
FIG. 2 is a diagram of the main data storage areas used in the system of FIG. 1.

FIG. 2 illustrates the main memory areas which are accessed and/or created during the operation of the present embodiment. In this case the memory used is secondary storage, for example a hard disk, although main memory, for example RAM, is typically used for manipulating the data before it is stored, or restored, in the secondary storage. In the present embodiment, the memory areas share the secondary storage device 110 with the database 112. The memory areas are for: a category list 200, a keyword list 205, a URL store 210, a document store 215, a report store 220, a search engine list 225, search engine syntaxes 230, search result files 235 and an initial list of URLs 240. Of these areas, the data in the category list 200, the keyword list 205, the search engine list 225 and the search engine syntaxes 230 is defined before the operation of the present embodiment. The remaining areas are used in operation.

Figure 3:
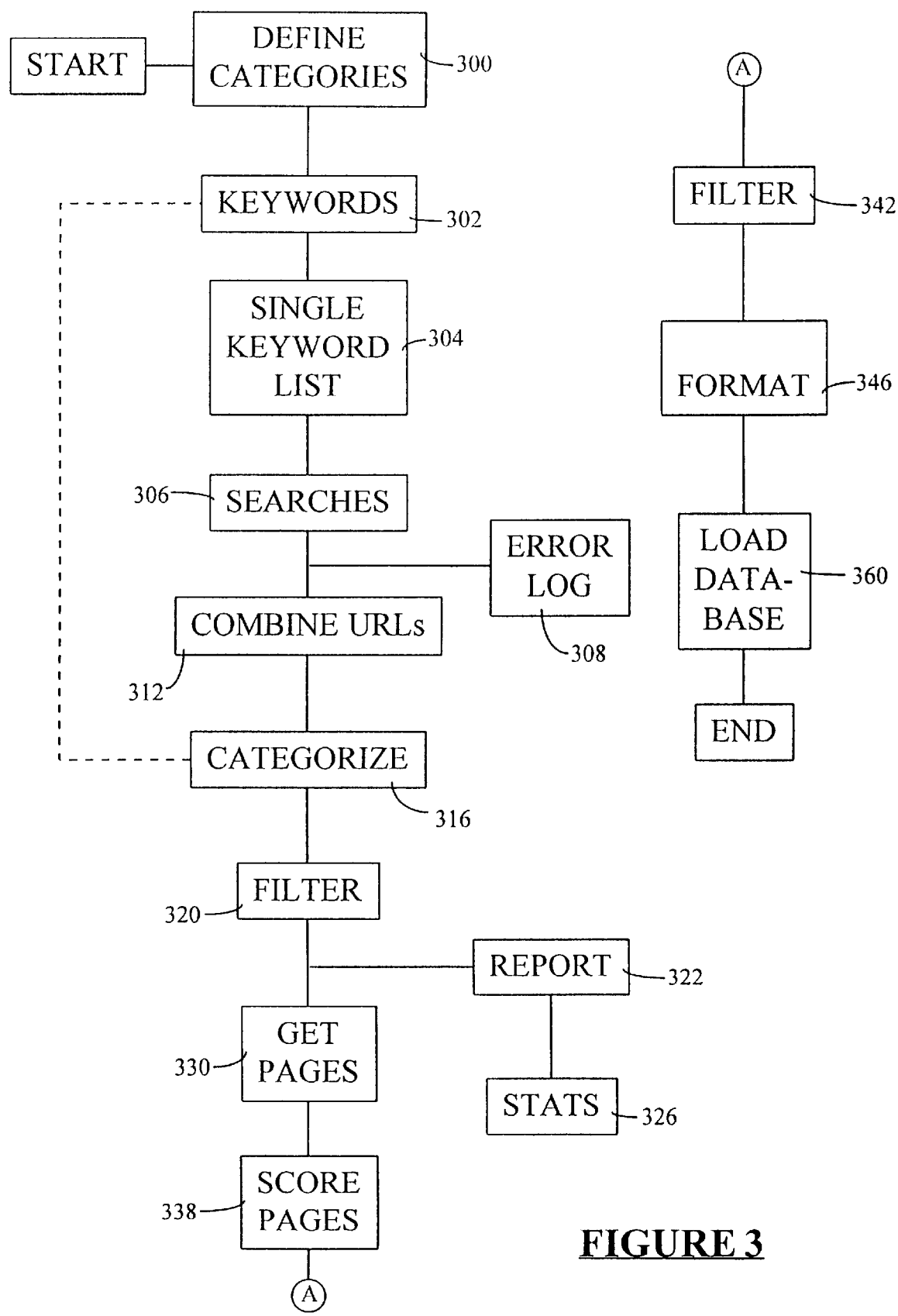
FIG. 3 is a flow diagram illustrating a method for building the database.

FIG. 3 in combination with the following description illustrates one method in accordance with the present invention for building and populating the database 112.

In step 300, a category list is provided in memory area 200 comprising headings and categories for inclusion in the database 112. The headings and categories provide a 1:1 mapping with those which will be user-selectable in the completed database. Next, in step 302, a list of keywords is generated for each of the categories for inclusion in the category list. The headings, categories and keywords are also provided with associated information which dictates exactly how they are intended to relate to one another in the database. The structure of the category list is described in more detail below. The keywords are provided for the purpose of building the database but do not, as such, form part of the ultimate database structure.

Once provided for each of the categories, the keywords are combined into a single keyword list, in step 304, and stored in memory area 205.

In a step 306, the keywords are passed in turn to one or more of the search engines 130a, 130b and 130c for keyword searching. In a conventional manner, each search engine produces search results for each keyword. For each keyword/search engine combination, the search results are stored in an individual text file in memory area 235.

Still in step 306, the URLs (Universal Resource Locators) are extracted from the search results held in each individual text file stored in memory area 235. As a result, there is obtained an individual list of URLs for the complete set of search results for each search engine. The URLs point to the candidate pages for the keywords found by the search engines. The URL lists are stored in memory area 240.

In a step 308, any errors resulting from the searches are recorded in memory area 220 in an error log for future analysis.

The process of step 306 for initiating searching by sending keywords to the search engineer, retrieving and storing the results and processing the results to obtain the URL lists is described in more detail below with reference to FIGS. 5 and 6.

The URL lists produced by the search engines are then combined in step 312 to form a single list of URLs arranged by keyword. This single list is stored in memory area 215. This step includes removing duplicate URLs where more than one search engine has raised the same URL for the same word. Obviously, this step need only be carried out if more than one search engine is used. The result of this is effectively a list of URLs for each keyword.

Then, in step 316, the list of URLs (which as mentioned above is arranged by keyword) is cross-referenced back with the original description of categories and keywords, generated in step 302, to identify those URLs which are candidates for each category. The URLs for each keyword in each category are then filtered, in step 320, to remove pages which are not to be processed. Pages which are commonly removed at this point include non-http references and other non-promising sites such as foreign language sites. This step may include checking each URL against a black (or indeed a white) list of sites, where a black-listed site would definitely not provide appropriate or relevant information and a white-listed site may be known to provide appropriate, good quality information. It will be appreciated that any suitable filtering policy could be employed at this point to create a directory of the desired type.

The details of filtered-out URLs are reported in step 322 to a text file to allow periodic checks to be carried out to ensure that good information is not being rejected. Statistics can be generated, in step 326, to help improve the filtering process (step 320) in the future.

In step 330, each of the URLs for each category, which remains after the filtering step 320, is used to retrieve the respective WWW page. The retrieved pages or documents are stored in memory area 215. In step 338, each retrieved page is scored against the category in which it is proposed. The scoring process, which in effect determines the relevance of a retrieved page and accordingly whether it should be included in the database, is described in more detail with reference to FIG. 7.

Once the pages have been scored, in a second filtering step 342, a cut-off point is introduced to indicate which pages, having scores above the cut-off point, are to go into the database 112. The cut-off point can be a fixed value indicative of, for example, a measure of the 'relevance' of a page (determined, for example, by the number of occurrences of the keyword in the page), to limit the maximum number of pages in each category. Alternatively, the cut-off point can be determined in some other appropriate manner depending on the type of search results achieved for particular categories.

The output of the second filter step 342 is arranged, in step 346, into a format that can be fed into the database 112 using conventional database loading routines. One suitable form of database for database 112 is a relational database, such as Oracle (TM).

Figure 4:
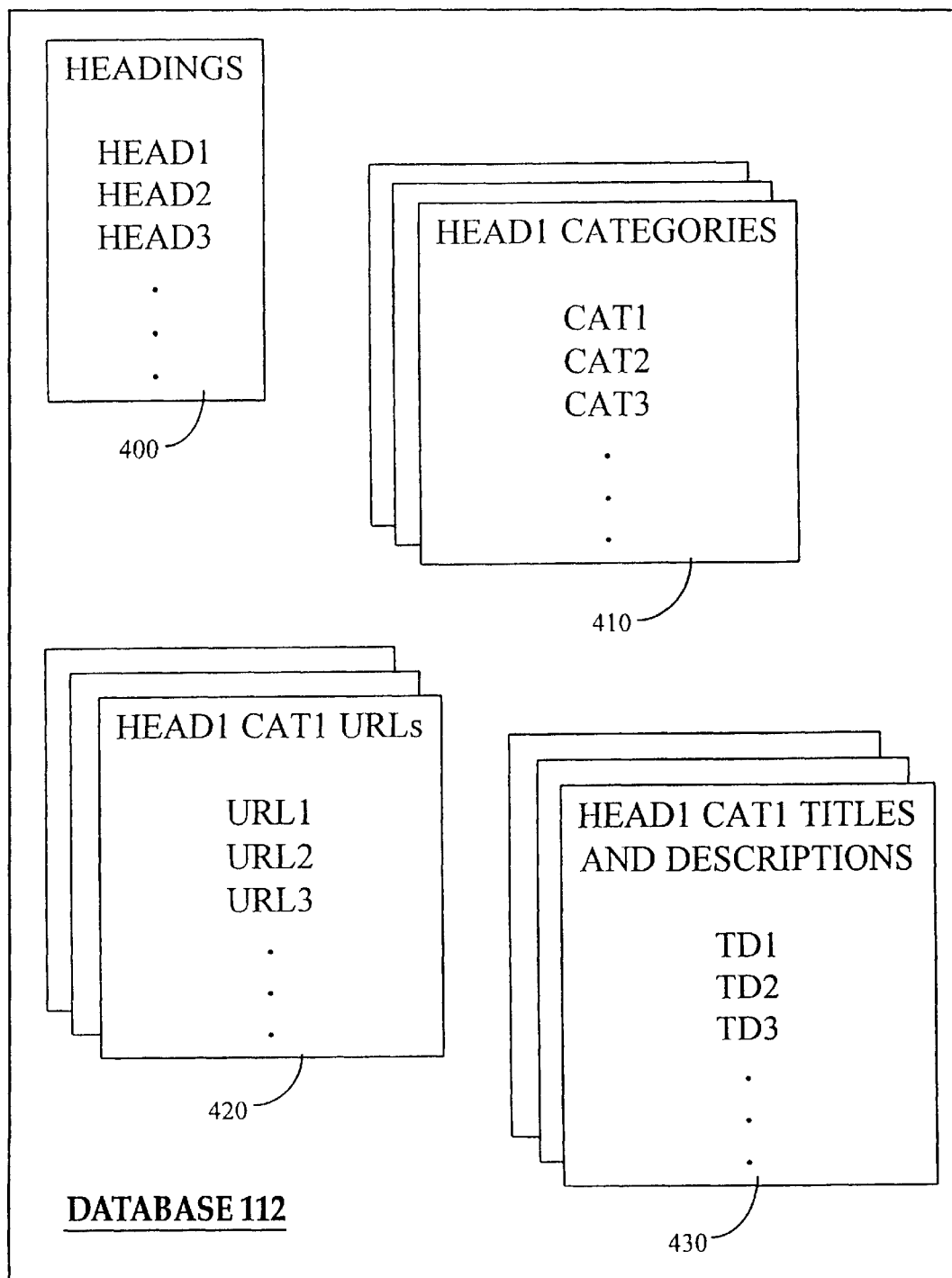
FIG. 4 is a diagram representing how the data is arranged in the database.

A suitable logical data arrangement for the database 112 is illustrated in FIG. 4. The available headings for the database 112 are stored in a first table 400. Each heading (HEAD1, HEAD2, etc) includes a reference to a category table 410 which lists the categories available to the user under that heading. Each category has two references: a first reference to a URL table 420 and a second reference to a title and description table 430. The title and description tables 430 hold the title and a brief summary of each page (having scores above a threshold, or the top n scores) which a user can access. The URL tables mirror the title and description tables by holding the URL for each accessible page. The URLs are used to retrieve the pages where required.

Once the data from step 346 has been arranged into a form suitable for loading into a database such as that described above, in step 360, the loading routines pass the data to the database 112 to be loaded into the database tables which have previously been created. Thus, the database 112 is populated in step 360. At this point, the database 112 is ready for use.

Once stored in the database 112, the data is accessed in a conventional manner using standard database scripts. The data is then presented to a user via a "front-end" user interface which can be made, for example, to resemble conventional search engines or Directories such as Yahoo. Database script and interface development uses conventional techniques which are not within the scope of the present description and will not be described in any more detail. For further information, the reader is referred to texts such as the Oracle (TM) users' guides.

An extract of an exemplary category list is reproduced below for reference to be used in combination with the subsequent description. The category list reflects the categories required in database 112.

(ballet:1:3, conga:2:1, samba:3:1, tango:1:1, waltz:2:1, modern:0:1, choreography:1:3, dance:1:5, rhumba:1:1, country dance:1:1, minuette:0:1, flamenco:0:1, cossack:0:1, disco:0:1)
=>films %%% hobbies & sports:cinema
(cinema:2:5, movie:1:5, flicks:2:1, movie-theatre:1:3, blockbuster:0:1, film:1:5, arthouse:0:1, hollywood:0:1, oscar:0:1, actor:0:1, actress:0:1, sound track:0:1, video:0:1)

```
=>photography %%% hobbies & sports:cameras & photos
    (camera:1:5, photo:1:5, slide:6:1, photograph:1:5,
        flash:0:1, kodak:0:1, olympus:0:3, pentax:0:3)
>>>>>hobbies & sports
=>cameras & photos
    (camera:1:5, photo:1:5, slide:6:1, photograph:1:5)
=>cinema
    (cinema:2:5, movie:1:5, flicks:2:1, movie-theatre:1:3,
        blockbuster:0:1, film:1:5, arthouse:0:1)
=>gardening
    (flower:1:3, plant:2:3, garden:3:5, tree:1:3, fruit:1:1,
        vegetable:2:1)
```

The category list is provided as a text file in a pre-determined format, similar to that illustrated above, which represents how keywords inter-relate. The text file is used by the system when database building commences.

In this example, there is a "heading" level above the category level. For convenience, only two headings (denoted by the syntax ">>>>>") are shown: "arts & entertainment" and "hobbies & sports". These headings, which in practice form part of a longer list of headings (which for convenience have not been illustrated) and which are of interest to a pre-determined group of users, are selected to form the top level set of choices presented to a user of a system once the database 112 has been built. These headings are eventually stored in the headings table 400 of the database.

Each heading has a list of categories (denoted by the syntax "=>"). These categories are presented to a user of the system in response to one of the headings being selected (in this example, only three categories for each heading are shown). The categories are stored in the category tables 410 in the database. Each category has a plurality of associated keywords, separated by commas. The keywords are stored in the URL tables 420 in the database. Each keyword has links to its URLs in the relevant URL table 320 and title and description data in the relevant title and description table 430.

As shown in the example, some categories are followed by further words or phrases preceded by a "%%%" syntax. This syntax is translated as "See Also". See also is a useful and commonly used technique which makes a user aware that further information on a certain topic can be found elsewhere. Using the "films" category as an example, the see also option refers to "hobbies & sports: cinema" which means see also the "cinema" category under the "hobbies & sports" heading. The see also entries can be stored in separate database tables, which have not been shown, and are referenced by the categories in the categories tables 410.

A further feature of the category list apparent from the example illustrated above is that each keyword has associated with it two numbers. The first number is the "sense" or meaning of the word. For example, "slide" can be a noun or a verb and as a noun "slide" can mean a photographic slide or a slippery slopping surface in a park for children to slide down. The sense is determined by reference to a dictionary source, and most preferably a dictionary source available in computer-readable format. Obviously, it is critical that the same dictionary source is used throughout the processing stages to ensure that the sense label for a word remains consistent.

The second number relates to the weighting of the keyword, or how relevant the keyword is to its associated category. For example, the weighting for "camera", under the category "photography", is 5 (where 5 represents the highest relevance) whereas the weighting for "flash" is only 1 (representing the lowest relevance). The influence these numbers have over the database creation is described in more detail below.

The category list itself can be defined by any method, or in any way. The easiest way to build the file is by hand, with a user (or the creator of the database) entering all keywords, for example by trial and error, to build the required database. However, more efficient methods of building the list are envisaged. For example, adaptive software could be provided for which a user is required to provide (or select from the WWW, for example) a number of pages of information relating to a specific subject in which the user is interested. On the basis of the pages provided, the software would determine commonly occurring words or phrases which are indicative of the area of interest. For example, if the user is interested in photography and provides three pages on the subject of photography, the software may well be able to highlight words such as "camera", "projector", "photo", etc., as being indicative of photography. In this way, for every subject of interest to the user, sample pages would be provided, keywords would be generated automatically and a category list would then be generated automatically. Alternatively, a computer-based thesaurus could be used to generate keywords for a single input category. Such a thesaurus could also be adaptive to include or discard certain words associated with certain categories (or vary a weighting associated with a word) on the basis of documents which were, at a later time, discarded from the database.

At the extreme, software could be provided to determine from, for example, the last x pages of information accessed on the Internet by a user, the main subject interest areas for that user on the basis of which subjects areas most commonly arise. Then, the actual category list as well as the keyword list could be defined by the software and the ultimate database build without any human intervention at any stage.

Other methods of simplifying category list creation will become apparent to the skilled person on reading the present description.

Thus, the present embodiment allows the required database to be created automatically, apart from supplying the category list and, possibly, the keywords.

The way in which search engines are used to generate URL lists is now described. Search engines are commonly used in association with the WWW. A search engine typically carries out a search in response to an http command. Essentially, such a command comprises a URL for the search engine and a fixed syntax specifying the search to be carried out by the search engine at that URL. Typically, the syntax for the same command for different search engines varies and needs to be determined before successful searching in this manner can be achieved on different search engines. The following http command example tells the search engine "AltaVista" to perform a search on the keyword "slide":

(altavista's URL/cgi-bin/query?pg=q&what=web&fmt=.&q=slide.

Obviously, it would be onerous to have to learn the correct syntax for each search engine, and search engine providers overcome this need by providing 'user-friendly' front end GUIs which are executed on a user's local computer system. The GUI allows a user to type a keyword in, for example, an appropriate box on a display screen and submit the search request by pressing a "submit" button (by positioning a mouse pointer over the button on the display screen and clicking the left-hand mouse button). The GUI takes the greatly-simplified user input, bundles it into the more complex form, similar to that shown above, and transmits it to the search engine.

In response to this, the search engine searches its database to find the relevant keyword and returns data including URLs for pages containing the keyword. Search results typically also include, for each page found, a title and a brief summary of the contents of the page. From the displayed search results, a user is able to click on any of the URLs in response to which the search engine retrieves the page indicated by the URL.

In general, the returned data is typically in the form of an html (Hypertext Markup Language) page of information. The page comprises unformatted text and respective html codes which define how the text should be displayed and how a user can interact with it within a GUI environment. Typically, within the unformatted text, headings, titles, body text are distinguished using different html codes. The GUI takes the html page and interprets the codes for the page to be presented to a user as a suitably-formatted, interactive graphical display of the information.

Since html is an industry-wide standard, it is a relatively simple task to read the bare, unformatted text and html codes and interpret which text relates to descriptions of, for example, WWW pages and which text relates to URLs etc. This is exactly what is done by the present embodiment, as described below.

Figure 5:
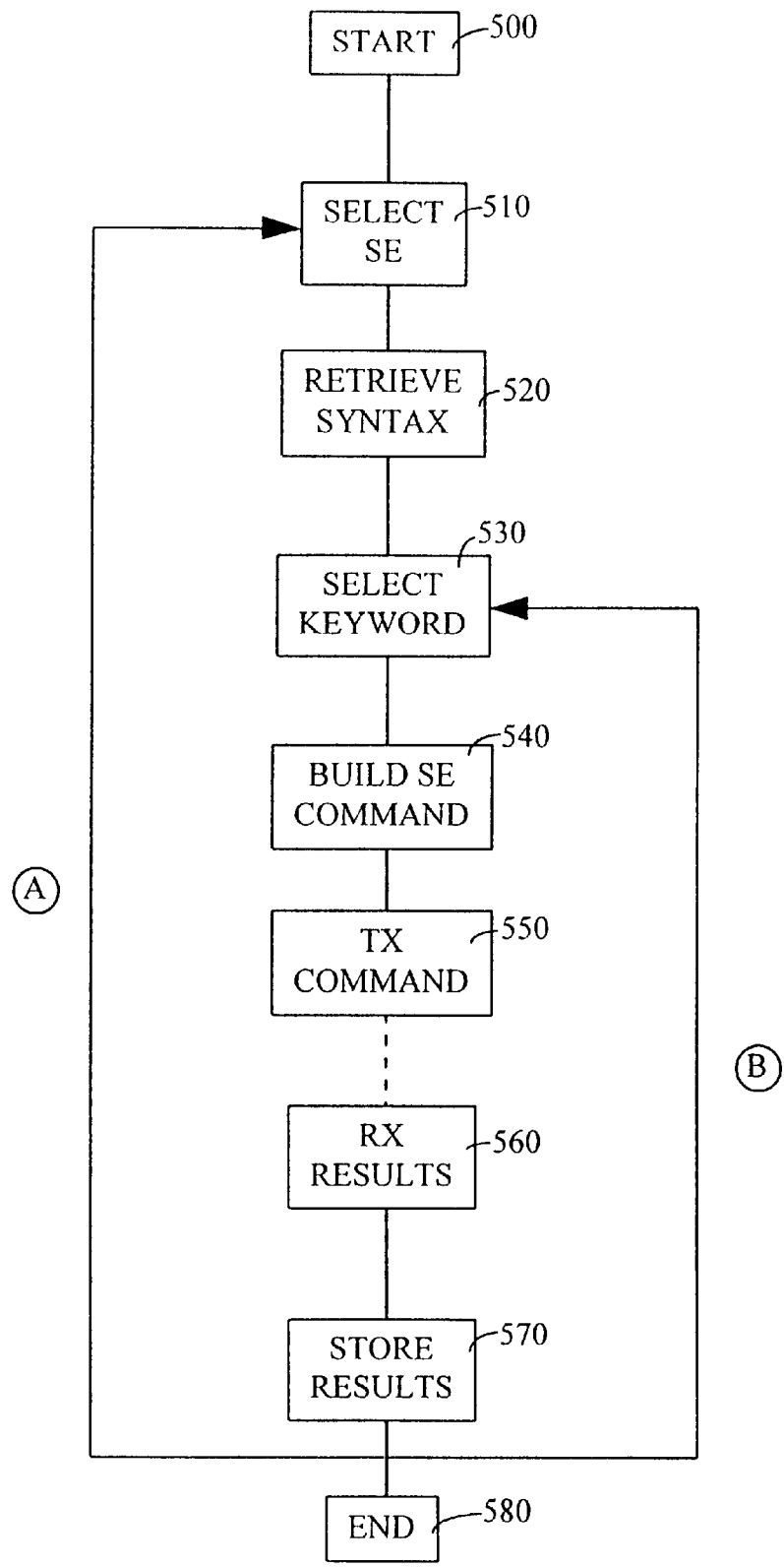
FIG. 5 is a flow diagram illustrating how documents are retrieved from distributed data sources when building the database.

With reference to FIG. 5, the process for controlling the search engines is as follows. In step 510, the search engine to be accessed is selected from a list of available search engines held in a file in memory area 225. Then, the syntax for the selected search engine is read from a separate text file in memory area 230, in step 520, for use in forming the search requests for this search engine. In step 530, the keyword list is accessed and the first keyword read from the list. The keyword is incorporated into an http command, in step 540, using the appropriate syntax. The command is then transmitted to the search engine in step 550. The process then awaits the search results until, in step 560, the results are received. The results are then stored in memory area 235 in a text file in step 570, where a new text file is used for each search engine/keyword combination.

The process follows return branch B unless all keywords have been searched and then follows return branch A (beginning again from the top of the keyword list) to select the next search engine on the list, unless all search engines have been accessed. The result of the process is a set of text files containing all the search results which are stored in memory area 235 for future reference.

The process shown in FIGS. 5 (and each of the following processes) is enacted by a software routine or batch file which is run on the PP 100, for example overnight, when communications costs are minimal.

The process described with reference to FIG. 5 is also able to react when a search engine or keyword request to a search engine does not respond, by moving on to the next search engine in the list, or the next keyword, whilst recording the failure of the search engine or request thereto to an error log (the error recording step 308 is shown in FIG. 3).

Figure 6:
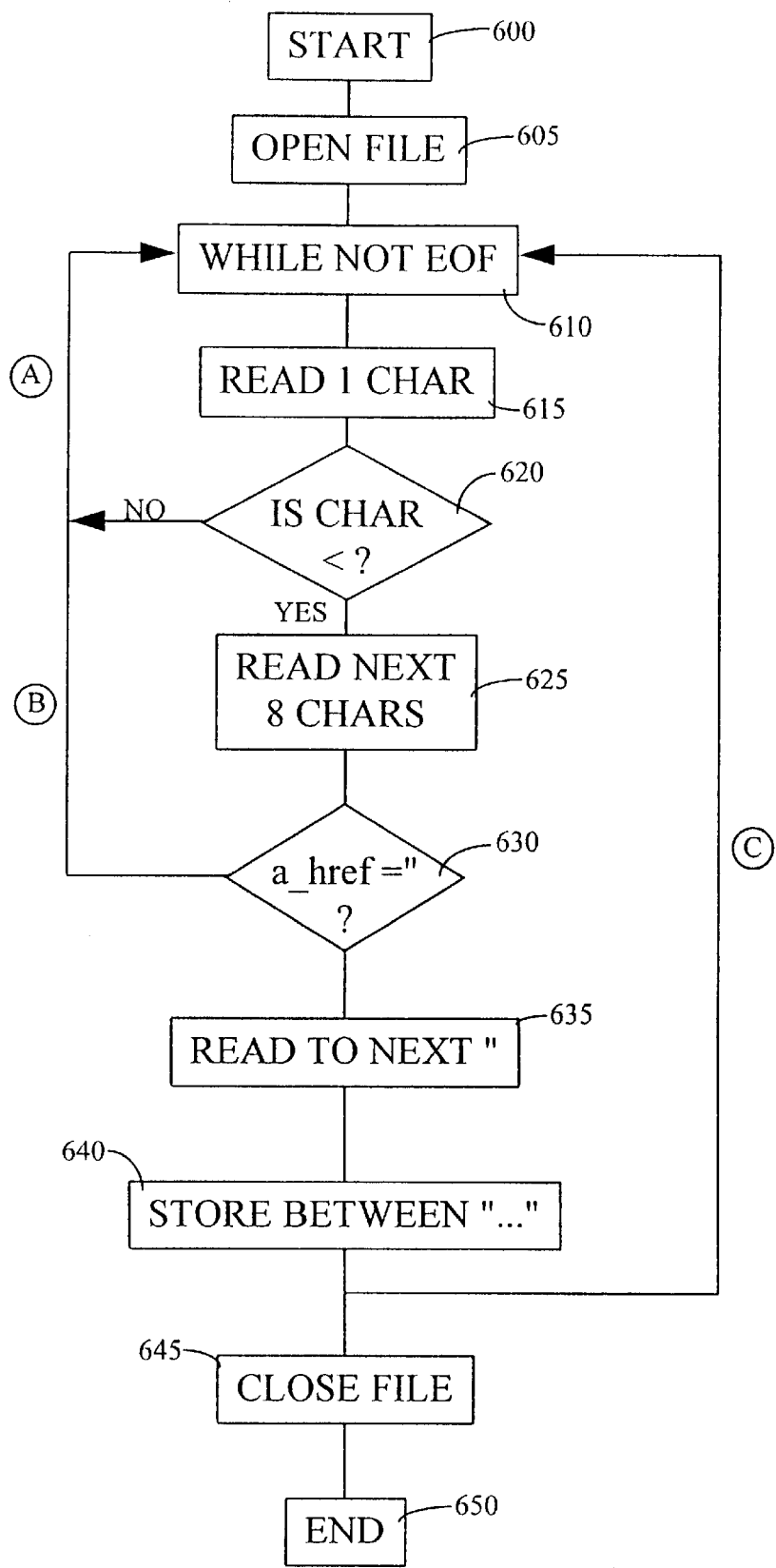
FIG. 6 is a flow diagram illustrating how search results are processed in the system of FIG. 1.

FIG. 6 illustrates the steps carried out in relation to the search result text files. For convenience, only one text file, representing one search engine/keyword combination, is considered.

In FIG. 6, the search results text file is opened in step 605 to be read sequentially, character by character. From the start of the file, and while the end of the file has not been reached (step 610), a single character is read from the file in step 615. In step 620, if the character is not a < character, then branch A is followed back to step 610 and a character counter (not shown), which dictates where characters in the file are read from, is incremented. The < character indicates in html that the following text (or part thereof) is an html code as opposed to normal text. In particular, URLs are identified by the html label a_href after a < character.

If the character is a <, the process goes to step 625. In step 625, the next eight characters are read from the file. These next eight characters are examined in a step 630. If these next eight characters are a_href=", then all following characters are read until the next " character in step 635. If the next eight characters are not a_href=", then branch B is followed from step 630 back to step 610 with the character counter being incremented by one. Further tests (which are not described in detail) determine whether the retrieved characters relate to URLs or to HyperText links, where HyperText links are not required for the present purposes.

After step 635, in step 640, the text between the first and second " characters, which represents a URL, is stored in a text file in memory area 240. The character counter is incremented by however many characters were read between steps 610 and 635.

Then, branch C is followed unless the whole text file has been read. If the whole file has been read, the file is closed and the process ends for the search engine/keyword combination under consideration.

The process shown in FIG. 6 is performed on the text file for each search engine/keyword combination. As a result, there is obtained an individual list of URLs extracted from the search results for each search engine. These lists are stored in memory area 240. After storing these lists of URLs in memory area 240, the overall process shown in FIG. 3 continues with step 312.

Figure 7:
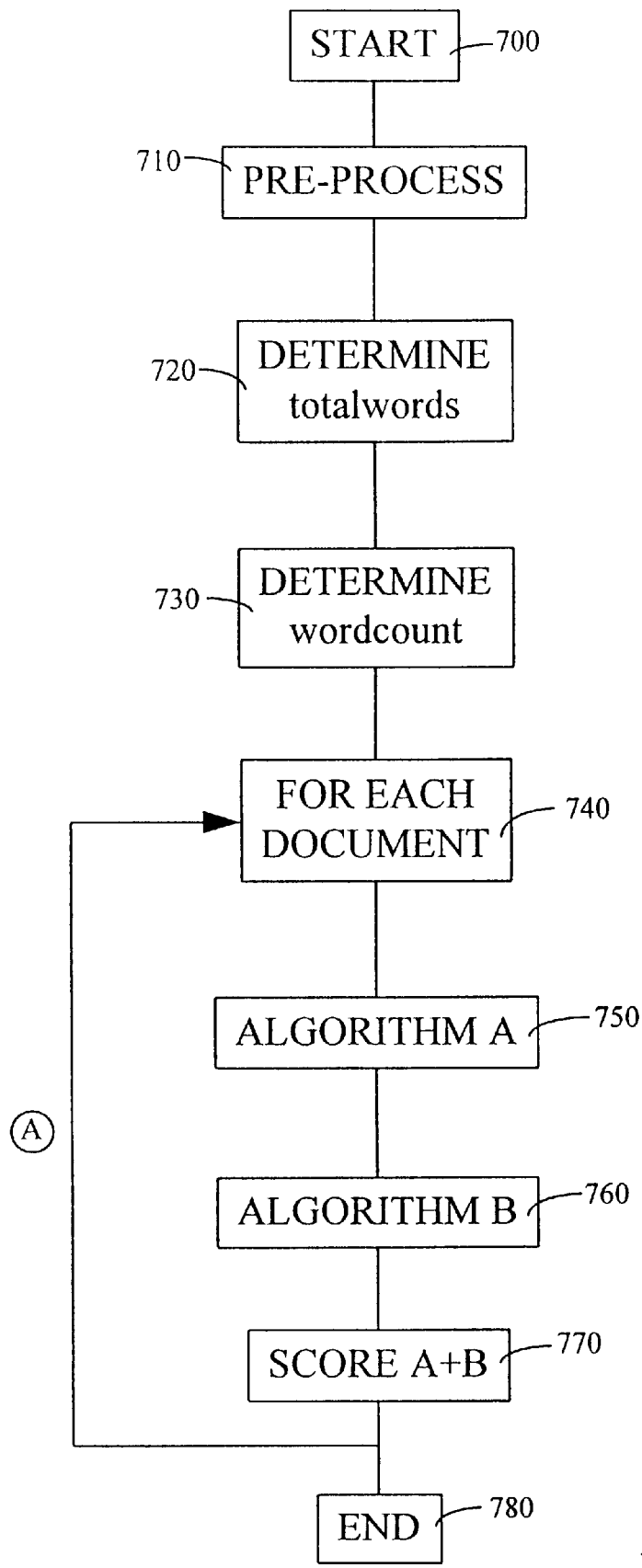
FIG. 7 is a flow diagram illustrating how documents are scored in the system of FIG. 1.

The method of scoring retrieved pages will now be described with reference to FIG. 7. Scoring is carried out after all documents for a particular category, a document set, have been retrieved since document scores relate in part to the content of the other documents in the set. In step 710, all the documents in the document set are pre-processed. Pre-processing requires several steps. Firstly, each page is split into title, headings, and the body of the text. With respect to the body of the text, that is to say the actual descriptive text of the page, the amount of text to be processed is fixed to limit the amount of overall processing. For example, only the first 20 lines may be used for scoring. Next, meaningless words and terms are removed to make scoring more efficient. For example, words such as "and", "the", "but", "a", "however", "since", etc, are all removed since they add nothing to the information content of a page. The next step in the pre-processing is to convert all words to root form, for example by making all nouns singular, converting all adverbs back to adjectives and converting all verbs to their infinitive form.

Once pre-processing is complete, the documents in the set are more readily comparable and scores assigned thereto have more meaning.

In step 720, a constant called "totalwords" is calculated which is the total number of words after pre-processing which remain in the set of documents. Then, in step 730, the number of occurrences "wordcount" of each keyword in the category is calculated for all documents in the set.

The remainder of the procedure (steps 740, 750, 760, 770) is carried out on each document in turn. Step 740 marks the beginning of the procedure which is carried out on each document.

In step 750, Algorithm A is used to operate on the body of the text of the document for each keyword in the category to produce an individual score for each keyword. Algorithm A is as follows:

$$\text{score} = \frac{\text{weight} \times \text{count} \times \text{totalwords} \times \text{order}}{\text{words in item} \times \text{wordcount}} \quad \text{Algorithm A}$$

weight: relevance attached to the word within a set of keywords for the category, as described above count: number of times the word appears in the page.

totalwords: number of words in the set of pages, as described above.

words in item: number of words in the page.

wordcount: number of times the word appears in the set of pages.

order: number of single words in keyword.

In step 760, Algorithm B is used to score the titles and headings for each keyword in the category to produce a set of individual scores for each keyword. Algorithm B is as follows:

Algorithm B score (title)=100×weight×count×order score (heading 1)=100×weight×count×order score (heading 2)=50×weight×count×order score (heading 3)=20×weight×count×order etc weight: relevance attached to the word within a set of keywords of category, as described above.

count: number of times the keyword appears in the respective title or heading.

order: number of single words in keyword.

As can be seen, the title is given the main importance, along with the first main heading. Subsequent sub-headings are given respectively lower scores since they are typically less relevant.

Once a page has been pre-processed and scored as described, the total score for the page is obtained by summing, in step 770, all the individual keyword scores from Algorithms A and B. Then, as described above, if the score is above a certain threshold value for the category it was scored against, the page is deemed to be relevant to that category and is eventually included in the database. As already stated, methods other than thresholding may be employed to determine which documents and included in the database, for example the top n scoring documents may be used, or the top m percentile of the documents.

The threshold, in this case, is determined by taking a sample of scored pages and checking them individually to see how relevant they are to a category and using their scores to judge the threshold value for that category.

Obviously, it is desirable to remove irrelevant documents including documents having keywords of the wrong sense for its allocated category from the database. This can be done before scoring in order to reduce the amount of processing required for scoring. Obviously, this step can be achieved manually by a human reading the page and making the decision. However, it is anticipated that natural language processing algorithms, which look inside sentences and understand sentence structure and semantics, will allow to a high degree of accuracy the sense of a word to be determined and will thus replace manual human intervention. Such techniques are widely reported and are becoming more efficient, and are beyond the scope of the present description. Suffice it to say that such techniques are preferably used in the present embodiment to determine the sense of keywords in the page. The determined sense is then compared with the required sense which is defined in the category list described above.

However, removal of irrelevant documents could be done at any point, for example even after the database is formed, by deleting URL entries.

It has been shown, however, that the scoring process described above itself removes such irrelevant documents naturally by allocating them a low score which is below the required threshold. For example, if documents relating to photographic slides were required and some (irrelevant) documents relating to children's slides were retrieved, the scoring process (looking for other relevant keywords such as "camera", "photograph" and "flash" etc.) would very likely not find the other keywords and accord the children's slide documents with correspondingly low scores and so such documents would be filtered out naturally.

Although in the system described above the distributed source database takes the form of information servers connected to the Internet, the system of the invention is suitable for use with other distributed source databases.

What is claimed is:

1. An apparatus for populating a destination database, said apparatus comprising:

a destination database;

means for connecting the apparatus to a distributed source database;

a memory area for containing a set of groups of keywords, each group of keywords being related to a predetermined subject category;

means for controlling at least one search engine associated with said distributed source database, on the basis of said groups of keywords contained in said memory area, to provide search results including information relating to the location of documents containing said keywords, said documents being stored in said distributed source database;

means for scoring each of the documents identified in search results provided by said at least one search engine on the basis of the respective contents thereof in accordance with predetermined criteria;

means for selecting at least some of the documents scored by said scoring means, on the basis of their respective scores; and means for storing, for each document selected by said selecting means, in said destination database information relating to the location of the document in said distributed source database and its predetermined subject category.

2. An apparatus as in claim 1, further comprising:

means for identifying locating information contained in search results provided by said at least one search engine and storing said location information in a second memory area.

3. An apparatus as in claim 1, further comprising:

means for retrieving documents identified in search results provided by said at least one search engine and storing said retrieved document in a document store.

4. An apparatus for populating a destination database, said apparatus comprising:

a destination database;

a memory area for containing a set of groups of keywords, each group of keywords being related to a predetermined subject category; and a processing platform which can access said destination database and said memory area, which is connectable to a distributed source database, and which is arranged to:

control at least one search engine associated with said distributed database, on the basis of said groups of keywords contained in said memory area, to provide search results including information relating to the location of documents containing said keywords, said document being stored in said distributed source database;

score each of the documents identified in said search results on the basis of the respective contents thereof in accordance with predetermined criteria;

select at least some of the documents on the basis of their respective scores; and store, for each selected document, in said destination database information relating to the location of the document in said distributed source database and its predetermined subject category.

5. An apparatus for populating a destination database, said apparatus comprising:
  a) means for connecting the apparatus to a distributed source database;
  b) a first memory area for storing a set of groups of keywords each group of keywords being associated with a pre-determined subject category;
  c) means for reading a keyword from the first memory area and transmitting said keyword to search means, said search means having access to the distributed source database;
  d) means for receiving search results from said search means and storing said results in a second memory area, said results including information relating to the location of documents stored in said source database containing said keyword;
  e) means for identifying and storing said location information in a third memory area;
  f) means for reading location information from the third memory area and transmitting a request to the source database to return a copy of a document associated with selected location information to the apparatus;
  g) means for receiving and storing said copy of said document in a fourth memory area;
  h) means for accessing and scoring each of the documents stored in the fourth memory area on the basis of the respective contents thereof in accordance with predetermined criteria; and
  i) means for selecting at least some of said documents on the basis of the respective scores and, for each selected document, storing in a database information relating to the location of the document in the source database and its predetermined subject category.

6. A method of populating a destination database, said method comprising:

controlling at least one search engine associated with a distributed source database, on the basis of a set of groups of keywords, each group of keywords being related to a predetermined subject category, to provide search results including information relating to the location of documents containing said keywords, said documents being stored in said distributed source database;

scoring each of the documents identified in said search results on the basis of the respective contents thereof in accordance with predetermined criteria;

selecting at least some of the documents on the basis of their respective scores; and storing, for each selected document, in said destination database information relating to the location of the document in said distributed source database and its predetermined subject category.

* * * * *